United States Patent
Watanabe et al.

(10) Patent No.: US 6,860,380 B2
(45) Date of Patent: Mar. 1, 2005

(54) WORKPIECE TRANSFER DEVICE FOR MACHINE TOOLS

(75) Inventors: Michio Watanabe, Yamatokoriyama (JP); Yoshinobu Okuyama, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 102 days.

(21) Appl. No.: 10/348,327

(22) Filed: Jan. 22, 2003

(65) Prior Publication Data

US 2003/0138311 A1 Jul. 24, 2003

(30) Foreign Application Priority Data

Jan. 22, 2002 (JP) ........................................ 2002-013022

(51) Int. Cl.[7] .............................................. B65G 25/00
(52) U.S. Cl. ............................ 198/750.11; 198/468.2; 414/749.1; 414/222.01; 901/14; 901/25
(58) Field of Search ........................... 414/749.1, 749.6, 414/751.1, 222.01, 222.07, 222.08; 198/468.2, 750.11; 212/331, 346; 901/14, 16, 25; 104/91, 172.4; 105/148, 172; 74/25, 29, 422

(56) References Cited

U.S. PATENT DOCUMENTS

| | | | | |
|---|---|---|---|---|
| 4,664,873 A | * | 5/1987 | Hendrich et al. | ........... 376/260 |
| 4,674,949 A | * | 6/1987 | Kroczynski | .............. 414/749.1 |
| 4,746,485 A | * | 5/1988 | Commander | ................. 376/206 |
| 4,836,111 A | * | 6/1989 | Kaufmann | ..................... 104/89 |
| 4,998,442 A | | 3/1991 | Brown et al. | |
| 5,125,789 A | * | 6/1992 | Farr | ............................ 414/728 |
| 5,267,478 A | * | 12/1993 | Stridsberg | .................. 74/89.17 |
| 5,326,197 A | * | 7/1994 | Takei | ........................... 408/91 |
| 5,934,141 A | * | 8/1999 | Costa | ......................... 74/89.17 |

* cited by examiner

*Primary Examiner*—Eileen D. Lillis
*Assistant Examiner*—Michael Lowe
(74) *Attorney, Agent, or Firm*—Smith Patent Office (57) ABSTRACT

A workpiece transfer device for machine tools that easily achieves positional adjustment of the rack while suppressing increases in cost and therefore preventing occurrences of vibrations and noise is disclosed. The workpiece transfer device includes a frame member having a rectangular cross-section. The device extends from a workpiece machining position to a workpiece loading/unloading position. A support member is hung on the frame member so as to be movable via a linear guide and which has a workpiece holding mechanism mounted thereon. A drive mechanism for rotationally driving a pinion gear engaged with a rack is provided on the frame member so as to be parallel to the linear guide so that the support member is moved between the two positions. The linear guide is disposed on one wall of the frame member and the rack is disposed on another wall surface so as to have its position adjustable.

2 Claims, 6 Drawing Sheets

WORKPIECE TRANSFER DEVICE FOR MACHINE TOOLS

BACKGROUND OF THE INVENTION

1. Field of the Invention

The present invention relates to a workpiece transfer device for machine tools. The device is constructed so that a support member having a workpiece holding mechanism is mounted on a frame member and is extendable between a workpiece machining position and a workpiece loading/unloading position via a linear guide. The support member is moved in a reciprocating motion by a rack-and-pinion drive mechanism.

2. Discussion of the Related Art

In recent years, some machine tools are equipped with a workpiece transfer device that is designed to automatically and continuously perform such working processes as receiving an unprocessed workpiece from the workpiece stocker disposed at the workpiece loading/unloading position, loading the workpiece in a chuck of a spindle (which is at the workpiece machining position), receiving the processed workpiece from the chuck of the spindle, and unloading the workpiece at the workpiece stocker.

Figure 8:
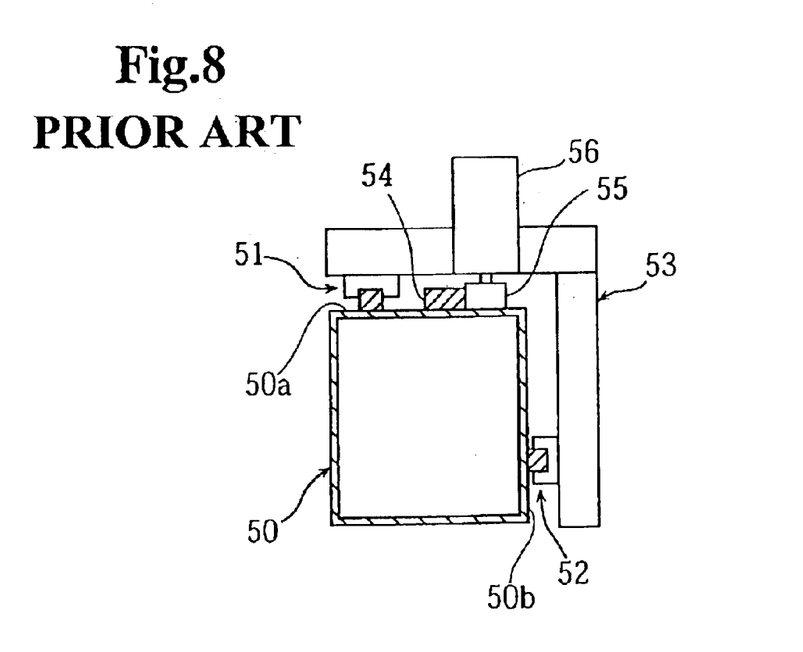
FIG. 8 is a sectional view of a workpiece transfer device according to a prior art device.

FIG. 8 shows a workpiece transfer device that has conventionally been provided. This device comprises a rectangular frame member 50 extending from a workpiece machining position to a workpiece loading/unloading position. The device also includes a support member 53 which is reciprocatably supported by two linear guides 51, 52 disposed on a top wall 50a and a side wall 50b of the frame member 50 and has a workpiece holding mechanism (not shown) mounted thereon. The device also includes a rack 54 disposed on the top wall 50a of the frame member 50 so as to extend along the linear guide 51. The device also includes a drive motor 56 for rotationally driving a pinion gear 55 engaged with the rack 54 to thereby move the support member 53 in a reciprocating fashion.

In this prior-art transfer device, the transfer device adopts a structure that the support member 53 is supported by two costly linear guides 51, 52. This causes a problem in that the cost for the whole device increases. Also, since the linear guides are disposed on two adjacent wall surfaces of the frame member, there is a need for ensuring the relative dimensional accuracy of the linear-guide fitting surfaces with the frame member surfaces. This accuracy also increases the cost of the transfer device.

Meanwhile, there is also a structure that allows the two linear guides to be reduced so that only one linear guide is used. In the transfer device shown in FIG. 7, one linear guide 61 is disposed on a top wall surface 60a of a frame member 60. A rack 64 is disposed on a bottom wall surface 60b on the symmetrically opposite side from the top wall surface 60a. The rack 64 has its right and left side faces pinched and held by a pair of cam followers 67. Also, a drive motor 66 rotationally drives a pinion gear 65 engaged with the rack 64.

Figure 7:
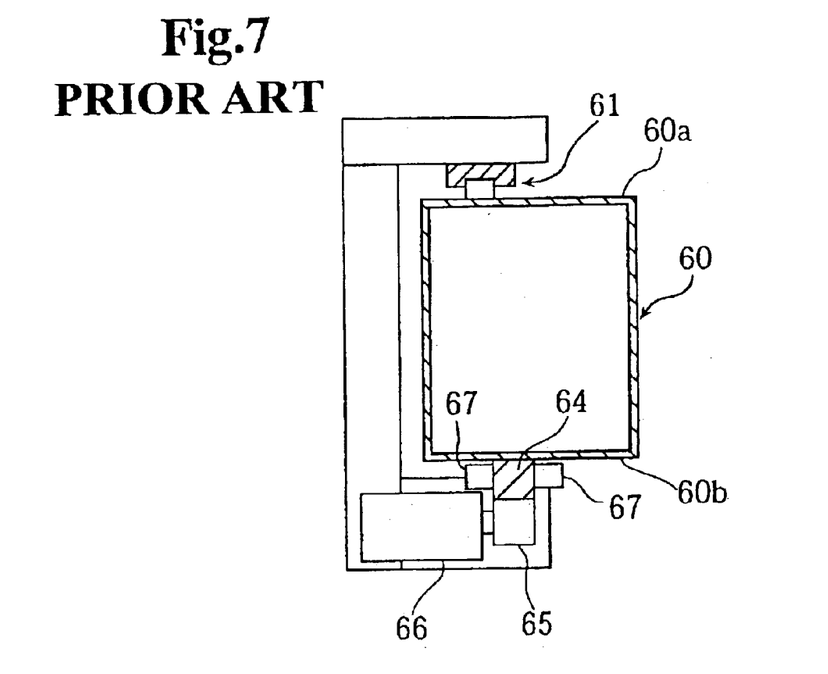
FIG. 7 is a sectional view of a common workpiece transfer device according to a prior art device.

In this structure, since one linear guide 61 can be used, cost increases can be reduced compared with the structure where two linear guides are used for support.

In this connection, general structural purpose steel tubes that have a relatively lower dimensional accuracy are adopted for the frame member 60. When using a structure where the linear guide 61 is fit on the top wall surface 60a of the frame member 60 and the rack 64 is disposed on the bottom wall surface 60b, there is difficulty in adjusting the vertical position of the rack 64 relative to the linear guide 61. If the vertical position is not properly adjusted then vibrations and/or noise can occur. Performing a machining process on the wall surfaces of the frame member 60 could solve the above problem; however, doing so would lead to impractical increases in cost.

SUMMARY OF THE INVENTION

The present invention has been accomplished in view of these circumstances. An object of the present invention is to provide a workpiece transfer device for machine tools that is capable of easily achieving positional adjustment of the rack while suppressing increases in cost and preventing occurrences of vibrations and noise.

In a first aspect of the invention, there is provided a workpiece transfer device for machine tools, comprising: a frame member having a rectangular cross-sectional shape and extending at least from a workpiece machining position to a workpiece loading and unloading position; a support member movably disposed on the frame member so as to be movable via a linear guide and the support member has a workpiece holding mechanism mounted thereon; and a drive mechanism disposed on the support member and serving for rotationally driving a pinion gear engaged with a rack, the rack is disposed on the frame member and is parallel to the linear guide, the support member being reciprocatingly movable between the workpiece machining position and the workpiece loading and unloading position, wherein the linear guide is disposed on a first wall surface of the frame member, and the rack is adjustably disposed on a second wall surface of the frame member adjoining the first wall surface so that a position of the rack is adjustable relative to the linear guide.

In a second aspect of the invention, the workpiece transfer device also includes cam followers disposed on the support member for pinching and holding the rack, wherein the first wall surface is a top wall surface and the second wall surface is a side wall surface, and wherein the linear guide is disposed on a top wall surface of the frame member, and the rack is disposed on a side wall surface of the frame member.

In a third aspect of the invention, the workpiece transfer device includes the linear guide and the rack disposed on one wall surface of the frame member, and the rack is adjustable in its position relative to the linear guide.

In a fourth aspect of the invention, the workpiece transfer device includes cam followers disposed on the support member for pinching and holding the rack, and the linear guide and the rack are disposed on a side wall surface of the frame member.

With the workpiece transfer device according to the first aspect, since the linear guide is disposed on one wall surface of the frame member and the rack is disposed on another adjoining wall surface, positional adjustment of the rack relative to the linear guide can be fulfilled with ease. Moreover occurrence of vibrations or noise can be prevented while reducing the number of component parts. Also, since only one fitting surface for the linear guide can be used, the frame member may have a lower dimensional accuracy when compared with the cases where two linear-guide fitting surfaces are necessary.

Further, since the rack thickness can be increased without increasing the height of the support member, warping of the rack during the tooth-cutting process can be prevented.

With the workpiece transfer device according to another aspect of the invention, since the linear guide and the rack are disposed on one same wall surface of the frame member, positional adjustment of the rack relative to the linear guide can be fulfilled with ease. Moreover occurrence of vibrations or noise can be prevented while reducing the number of component parts so that the same benefits can be obtained.

Also, since the linear guide and the rack are disposed on the same wall surface, it is only necessary to perform planar machining on one side wall surface, thus allowing the machining costs to be reduced compared with the cases where two wall surfaces must be subjected to machining.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Hereinbelow, embodiments of the present invention are described with reference to the accompanying drawings.

Figure 1:
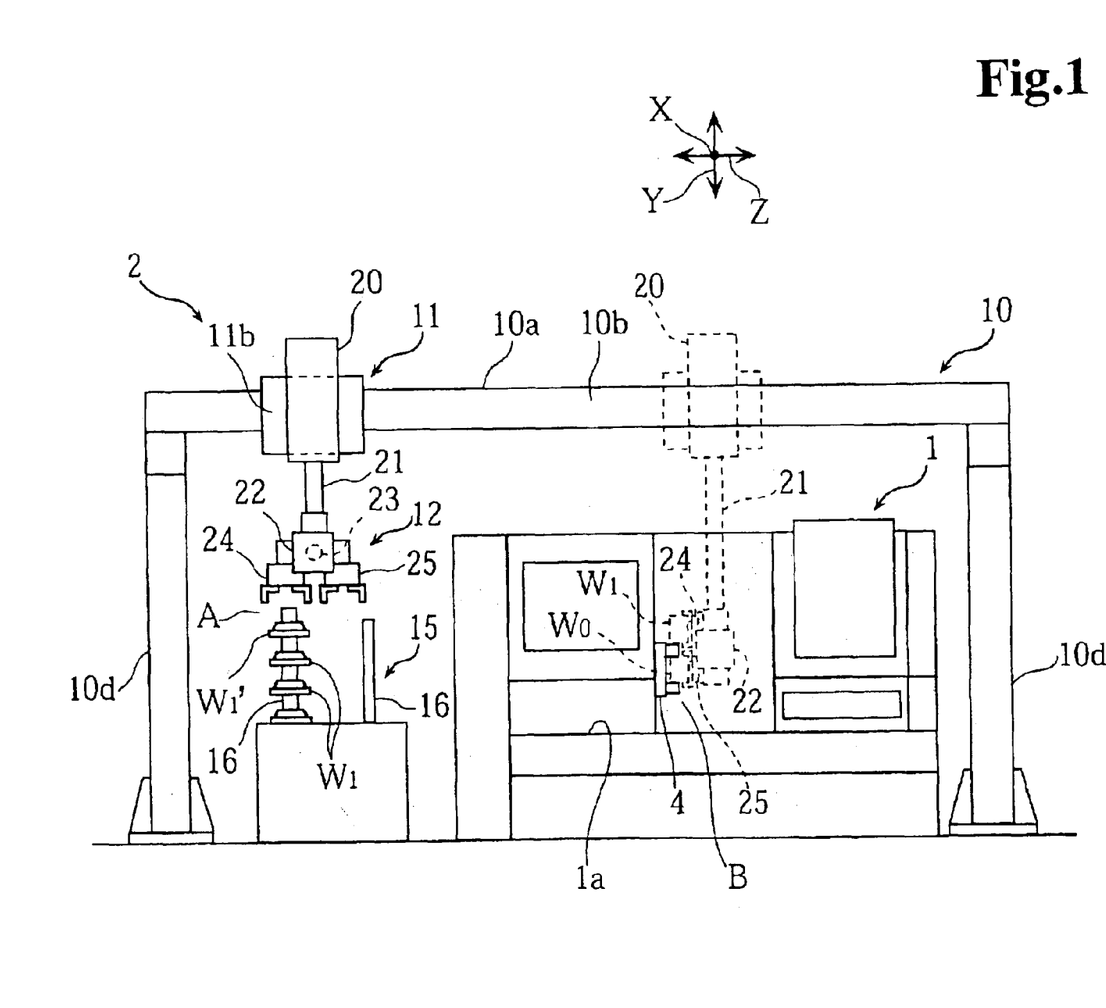
FIG. 1 is a front view of a lathe equipped with a workpiece transfer device according to a first embodiment of the present invention.
Figure 2:
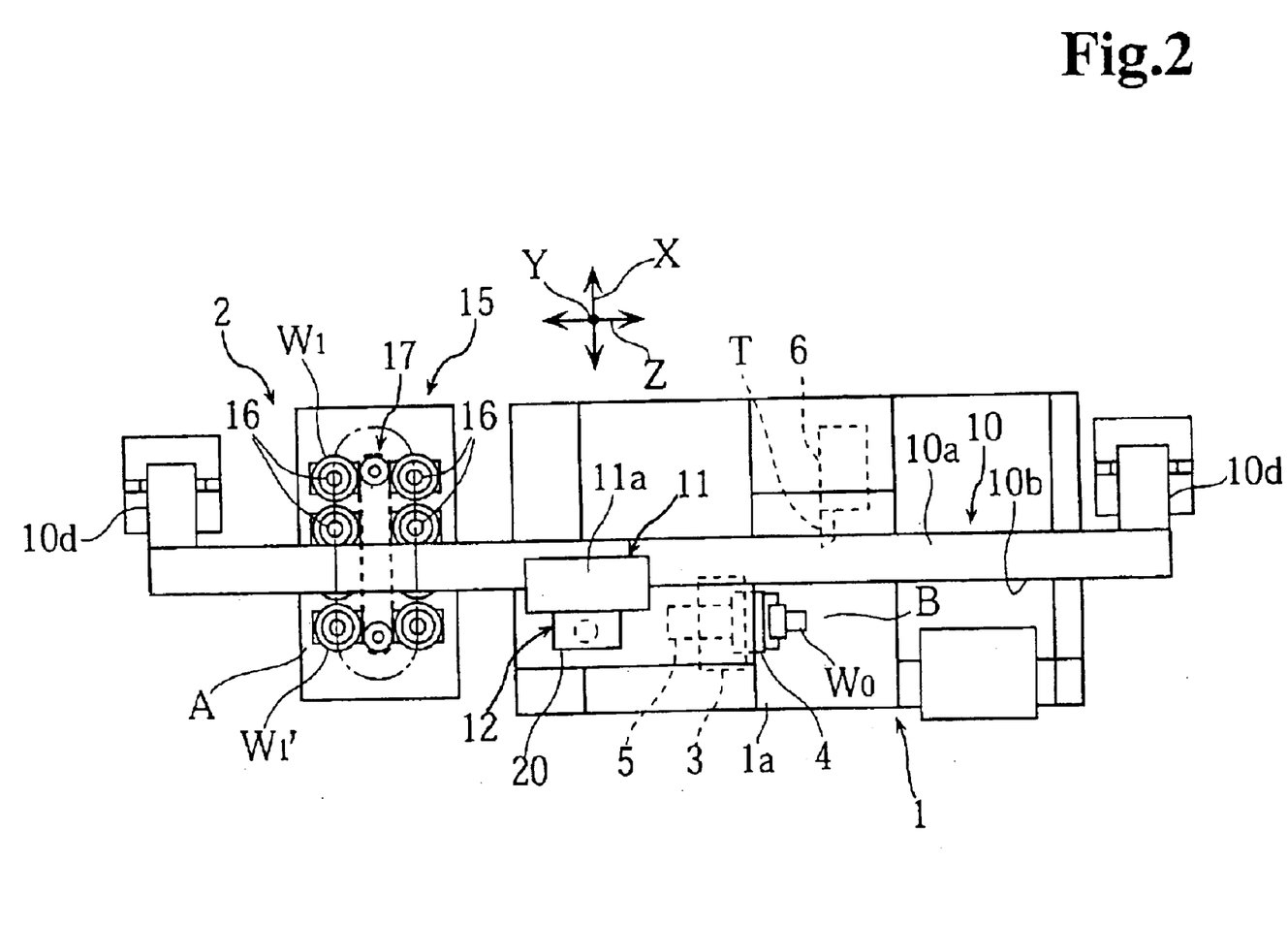
FIG. 2 is a plan view of the lathe in FIG. 1 according to an embodiment of the present invention.
Figure 3:
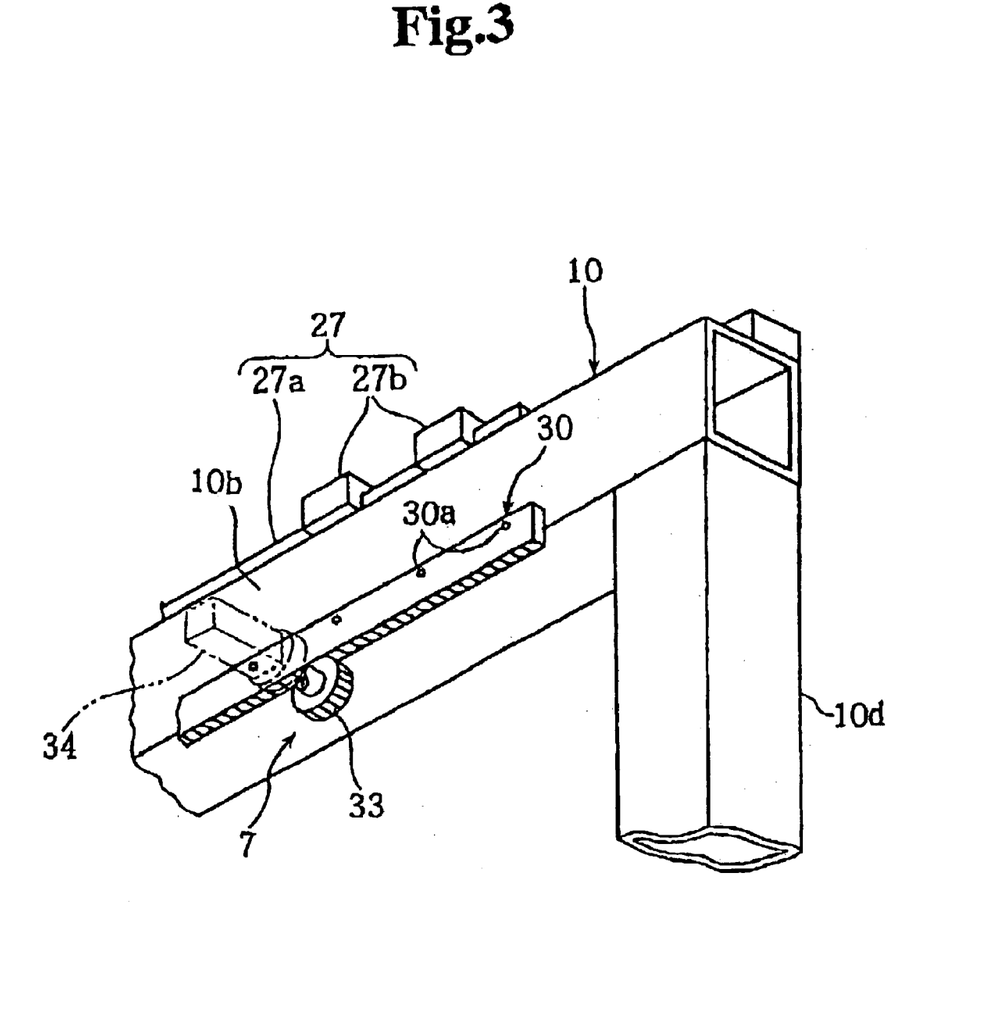
FIG. 3 is a schematic perspective view of the workpiece transfer device according to an embodiment of the present invention.
Figure 4:
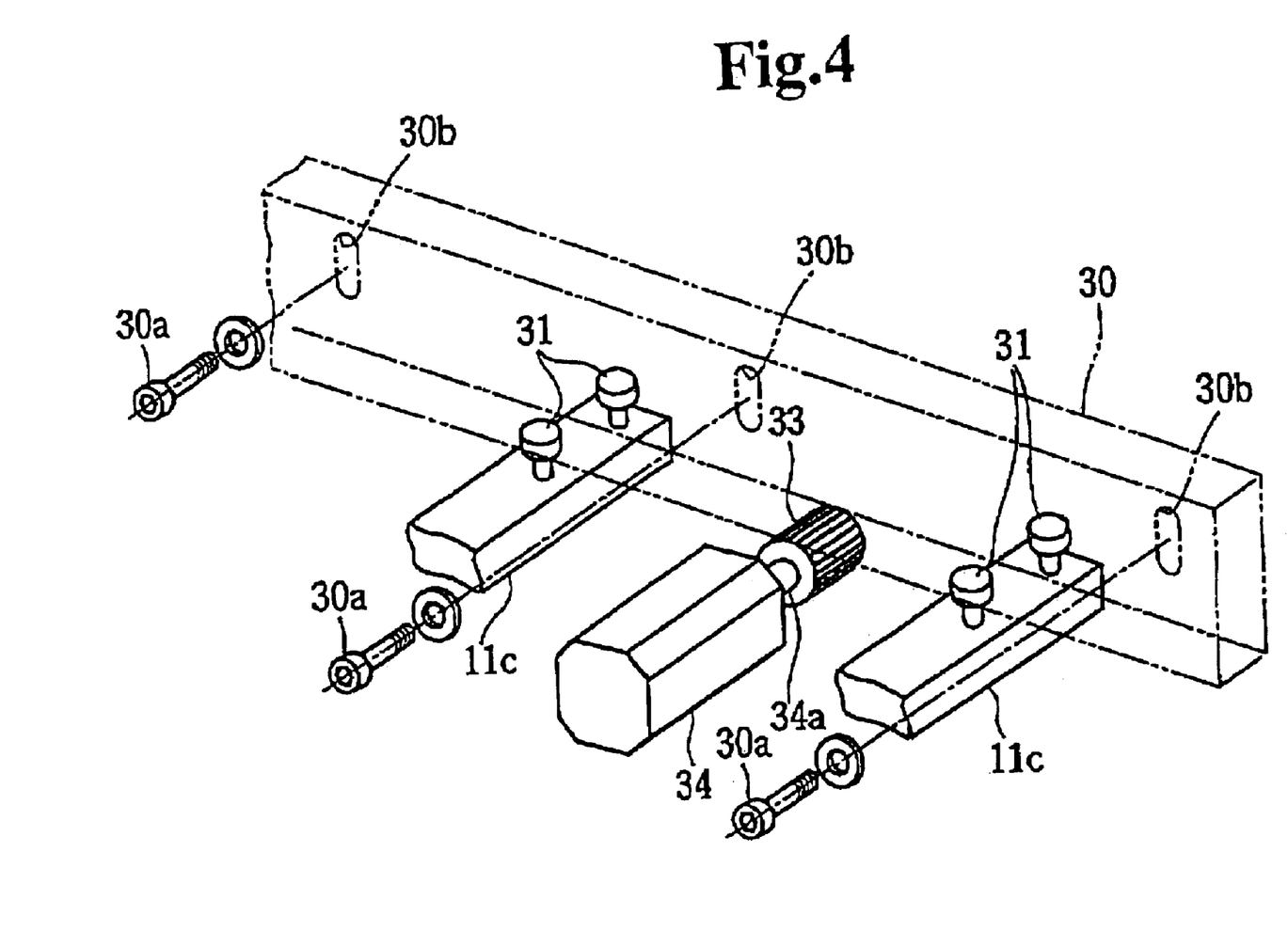
FIG. 4 is a schematic perspective view of the workpiece transfer device according to an embodiment of the present invention.
Figure 5:
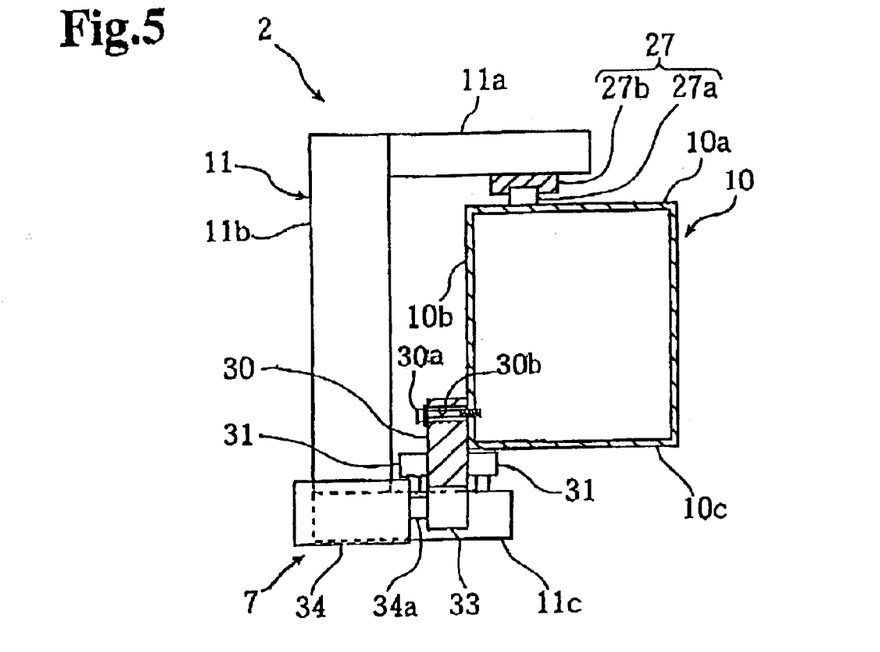
FIG. 5 is a sectional view of the workpiece transfer device according to an embodiment of the present invention.

FIGS. 1 to 5 are views explaining a workpiece transfer device for lathes and other machine tools according to a first embodiment of the invention. FIGS. 1 and 2 show a front view and a plan view, respectively, of a lathe equipped with the workpiece transfer device. FIGS. 3 and 4 are schematic perspective views of the workpiece transfer device. Further, FIG. 5 is a sectional view of the workpiece transfer device.

Referring to the figures, a lathe 1 is equipped with a workpiece transfer device 2. The lathe 1 is constructed so that a spindle 5 having a chuck 4 for holding a workpiece is rotatably supported by a headstock 3 provided on a fixed bed 1a. A tool rest 6 loaded with a plurality of tools T is provided on the fixed bed 1a so as to be relatively movable in the X-axis, Y-axis and Z-axis directions. Then, the tool rest 6 is moved relative to the workpiece Wo. The chuck 4 holds the workpiece Wo so that the workpiece is machined using the tool T.

Figure 6:
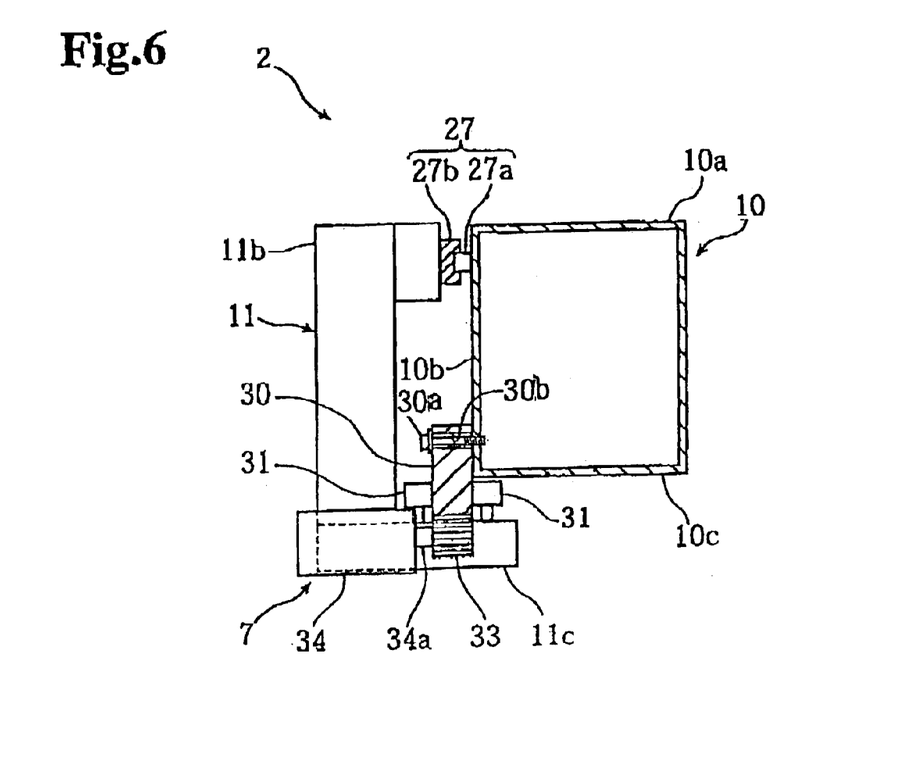
FIG. 6 is a sectional view explaining a workpiece transfer device according to a second embodiment of the present invention.

The workpiece transfer device 2 is disposed above the lathe 1. The workpiece transfer device 2 comprises a frame member 10 extending from a workpiece loading/unloading position A to a workpiece machining position B. The workpiece transfer device 2 also includes a support member 11 supported by the frame member 10 so as to be movable in the Z-axis direction. A workpiece holding mechanism 12 is mounted on the support member 11 as shown in FIGS. 1 and 2. Also, FIGS. 3, 5 and 6 show two different drive mechanisms 7.

The frame member 10 is made of pipe steel having an oblong-shaped cross section. The frame member 10 is hung and supported by vertical column members 10d provided at the left and right end portions.

A workpiece stocker 15 is provided at the workpiece loading/unloading position A. This workpiece stocker 15 has a plurality of guide shafts 16 for supporting a plurality of unprocessed workpieces W1 in a stacked state, and a transfer drive mechanism 17 for transferring the next-to-be-processed workpiece W1', from the unprocessed workpieces W1, to the workpiece takeout position.

The workpiece holding mechanism 12 has an up-and-down moving mechanism 20 placed and fixed on the support member 11, a loader arm 21 to be driven up and down in the Y-axis direction by the up-and-down moving mechanism 20, and a loader head 22 fitted at a lower end of the loader arm 21. This loader head 22 is formed so as to be rotatable 90 degrees about a shaft 23 perpendicular to an axis of the loader arm 21 by a drive mechanism (not shown).

The loader head 22 has a pair of hands 24, 25 for holding a next-to-be-processed workpiece W1' and a processed workpiece W0. Each of these hands 24, 25 can be directed leftward in the Z-axis direction (see broken line in FIG. 1) or downward in the Y-axis direction (see solid line in FIG. 1) by rotating them 90 degrees.

The support member 11 has a lateral side portion 11a opposed to a top wall 10a of the frame member 10. The support member 11 also has a longitudinal side portion 11b extending downwardly from a front end portion of the lateral side portion 11a and opposed to a front side wall 10b of the frame member 10. The support member 11 also has a left-and-right pair of lower side portions 11c extending from a lower end portion of the longitudinal side portion 11b downwardly of a bottom wall 10c of the frame member 10. The workpiece holding mechanism 12 is attached at the longitudinal side portion 11b.

A linear guide 27 is provided between the top wall 10a of the frame member 10 and the lateral side portion 11a of the support member 11. This linear guide 27 is constructed so that a pair of bearing blocks 27b disposed on the lateral side portion 11a of the support member 11, so as to be fixedly spaced from each other, are slidably fitted to a guide rail 27a fixedly disposed on the top wall 10a so as to extend along the length of the top wall 10a. As a result of this arrangement, the support member 11 is supported by the frame member 10 and is movable in the Z-axis direction via the linear guide 27.

Further, a rack 30 is provided parallel to the guide rail 27a at a lower end portion of the front side wall 10b adjoining the top wall 10a of the frame member 10. This rack 30 is formed into a vertically oblong bar-shaped body, as viewed in its cross section. The rack 30 is also fixedly disposed on the front side wall 10b so as to be adjustable in its vertical position relative to the linear guide 27. More specifically, the rack 30 is fixed to the front side wall 10b of the frame member 10 with bolts 30a screwed into the front side wall 10b through bolt insertion holes 30b which are formed into vertically longer elongate holes. The fitting position of the rack 30 can be adjusted so that the distance to the linear guide 27 becomes constant over the entire length of the rack 30.

A lower portion of the rack 30 protrudes downwardly of the bottom wall 10c of the frame member 10, and a lower surface of the protruding portion has rack teeth that were formed by a tooth-cutting operation.

A pair of cam followers 31 are in rolling contact with the front side face and the rear side face of the rack 30. The cam followers 31 are pivotally held on lower side portions of the support member 11. The forward and backward movement of the lower side portions 11c is regulated by the cam followers 31.

Further, a pinion gear 33 is engaged with the rack teeth of the rack 30. The pinion gear 33 is mounted on a rotating shaft 34a of a drive motor 34. This drive motor 34 is fixedly placed on the support member 11. When the drive motor 34 drives the pinion gear 33 in rotation, the support member 11 reciprocates between the workpiece loading/unloading position A and the workpiece machining position B.

Next, additional benefits of this embodiment are described.

In the workpiece loading/unloading position A, the loader arm 21 moves down along the Y-axis direction, holding the next-to-be-processed workpiece W1' in one hand 24. The loader arm 21 then moves up in the Y-axis direction to the upper end while holding the workpiece W1'. Subsequently, the support member 11 moves along the frame member 10 to the spindle side in the Z-axis direction.

When machining on the workpiece held by the chuck 4 of the lathe 1 is completed, the tool rest 6 moves back, and stands by. Then, the hands 24, 25 turn so they face the chuck 4, and the loader arm 21 moves down in the Y-axis direction, so that the empty hand 25 is positioned in the workpiece machining position B confronting the chuck 4.

The hand 25 moves to the chuck side in the Z-axis direction, holding the processed workpiece W0 held by the chuck 4. The hand 25 then moves slightly back in the Z-axis direction pulling the processed workpiece W0 off. In this state, the hand 25 moves down in the Y-axis direction, and the hand 24 is then positioned in the workpiece machining position B, moving forward in the Z-axis direction so that the next-to-be-processed workpiece W1 is mounted and held on the chuck 4. In this way, the processed workpiece W0 and the next-to-be-processed workpiece W1 are automatically exchanged therebetween.

Next, the loader arm 21 moves up in the Y-axis direction and then it moves to the workpiece stocker side in the Z-axis direction. The hands 24, 25 are then turned downward and moved down in the Y-axis direction, where the processed workpiece W0 is placed on an empty guide shaft 16 and stored in the workpiece stocker 15.

According to the workpiece transfer device 2 of this embodiment, since the linear guide 27 is disposed between the top wall 10a of the frame member 10 and the lateral side portion 11a of the support member 11 and since the rack 30 is disposed on the front side wall 10b adjoining the top wall 10a, vertical positional adjustment of the rack 30 relative to the linear guide 27 can be fulfilled with ease by utilizing the bolt insertion hole 30b. The bolt insertion hole 30b is an elongate hole and allows adjustment of the fitting position of this rack 30. Moreover, the occurrence of vibrations or noise can be prevented while adopting relatively low dimensional accuracy square pipe steel for building use as the frame member 10.

Further, since the vertical size of the rack 30 (rack thickness) can be increased without increasing the height of the support member 11, warping of the rack 30 during the formation of the rack teeth at its lower surface by tooth-cutting can be prevented.

Furthermore, the front and rear side faces of the rack 30 can be pinched and easily held and secured by the cam followers 31, so that back-and-forth vibrations of the support member 11 can be prevented notwithstanding the use of one linear guide.

FIG. 6 is a view for explaining a workpiece transfer device according to a second embodiment of the present invention. In this figure, the same reference numerals are used as those in FIG. 5 to show the same or equivalent component members.

The workpiece transfer device 2 of this embodiment comprises a frame member 10 extending from a workpiece loading/unloading position A to a workpiece machining position B, a support member 11 supported by the frame member 10 so as to be movable in the Z-axis direction, a workpiece holding mechanism 12 mounted on the support member 11, and a drive mechanism 7. The basic construction of this workpiece transfer device 2 is similar to that of the first embodiment.

Further, a linear guide 27 and a rack 30 are disposed on a front side wall 10b of the frame member 10. This linear guide 27 is fixedly placed at an upper end portion of the front side wall 10b, and the rack 30 is disposed at a lower end portion of the front side wall 10b so its vertical position relative to the linear guide 27 is adjustable.

According to this embodiment, since the linear guide 27 and the rack 30 are disposed on the front side wall 10b of the frame member 10, the vertical positional adjustment of the rack 30 relative to the linear guide 27 can be fulfilled with ease by utilizing the bolt insertion hole 30b. This hole is an elongate hole and allows for adjustment of the fitting position of this rack 30 so that the same effects of the first embodiment can be obtained.

Furthermore, in this embodiment, since the linear guide 27 and the rack 30 are disposed on the same plane of the front side wall 10b, only planar machining of the front side wall 10b is necessary. This allows the machining costs to be reduced compared to the cases where two wall surfaces are subjected to machining.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2002-013022 filed Jan. 22, 2002 is hereby incorporated by reference.

What is claimed is:

1. A workpiece transfer device for machine tools, comprising:
   a frame member having a rectangular cross-sectional shape and extending at least from a workpiece machining position to a workpiece loading and unloading position;
   a support member movably disposed on the frame member so as to be movable via a linear guide and the support member has a workpiece holding mechanism mounted thereon; and
   a drive mechanism disposed on the support member and serving for rotationally driving a pinion gear engaged with a rack, the rack is disposed on the frame member and is parallel to the linear guide, the support member being reciprocatingly movable between the workpiece machining position and the workpiece loading and unloading position, wherein the linear guide is disposed on a first wall surface of the frame member, and the rack is adjustably disposed on a second wall surface of the frame member adjoining the first wall surface so that a position of the rack is adjustable relative to the linear guide; and cam followers disposed on the support member for pinching and holding the rack, wherein the first wall surface is a top wall surface and the second wall surface is a side wall surface, and wherein the linear guide is disposed on a top wall surface of the frame member, and the rack is disposed on a side wall surface of the frame member.

2. A workpiece transfer device for machine tools, comprising:

a frame member having a rectangular cross-sectional shape and extending at least from a workpiece machining position to a workpiece loading and unloading position;

a support member movably disposed on the frame member so as to be movable via a linear guide and the support member has a workpiece holding mechanism mounted thereon a drive mechanism disposed on the support member and serving for rotationally driving a pinion gear engaged with a rack, the rack is disposed on the frame member and is parallel to the linear guide, the support member being reciprocatingly movable between the workpiece machining position and the workpiece loading and unloading position, wherein the linear guide and the rack are disposed on one wall surface of the frame member, and the rack is adjustable relative to the linear guide; and cam followers disposed on the support member for pinching and holding the rack, wherein the linear guide and the rack are disposed on a side wall surface of the frame member.

* * * * *